United States Patent [19]

Kraemer et al.

[11] 4,073,729
[45] Feb. 14, 1978

[54] FILTERING PROCESS USING INORGANIC SYNTHETICALLY PREPARED FILTER SAND

[75] Inventors: Stefan Kraemer, Essen; Michael Seger, Krefeld-Linn; Alois Seidl, Thurnstein, all of Germany

[73] Assignee: Wasag-Chemie AG, Munich, Germany

[21] Appl. No.: 426,617

[22] Filed: Dec. 12, 1973

Related U.S. Application Data

[63] Continuation of Ser. No. 217,643, Jan. 13, 1972, abandoned.

[51] Int. Cl.² .............................................. B01D 23/16
[52] U.S. Cl. ........................................ 210/80; 210/82
[58] Field of Search .................... 210/65, 80, 82, 263, 210/275, 290, 500, 504, 509; 252/448, 449

[56] References Cited

U.S. PATENT DOCUMENTS

| 293,745 | 2/1884 | Hyatt | 210/290 |
| 3,184,371 | 5/1965 | Seidl | 264/42 |
| 3,235,635 | 2/1966 | Riede | 210/500 |
| 3,343,680 | 9/1967 | Rice et al. | 210/263 |
| 3,471,025 | 10/1969 | Dobson | 210/290 |

*Primary Examiner*—Thomas G. Wyse
*Assistant Examiner*—Ivars Cintins
*Attorney, Agent, or Firm*—Gilbert L. Wells

[57] ABSTRACT

A process for removing solids from a liquid wherein the liquid is passed through a bed of filter media comprising discrete, inorganic, artificially produced filter sand, and wherein the artificially produced filter sand has grain densities of between about 1.0 to 2.2 grams per cubic centimeter and grain diameters of between about 0.3 and 10 mm and the grain density decreases with increasing grain diameter.

9 Claims, No Drawings

4,073,729

FILTERING PROCESS USING INORGANIC SYNTHETICALLY PREPARED FILTER SAND

This is a continuation of Application Ser. No. 217,643, filed Jan. 13, 1972, now abandoned.

CROSS-REFERENCES TO RELATED APPLICATIONS

Applicants claim priority under 35 U.S.C. 119 for Application P 21 04 048.2, filed Jan. 28, 1971, in the Patent Office of the Fereral Republic of Germany. The disclosure of copending Application Ser. No. 56,075, filed June 29, 1970, is incorporated herein.

BACKGROUND OF THE INVENTION

The field of the invention is processes for liquid purification or separation. The invention is particularly concerned with an improvement in a process for filtering off suspended particles from liquids, especially water, by using inorganic artificially produced filter sand.

The state of the art for producing the raw materials of the present invention may be ascertained by reference to U.S. Pat. Nos. 3,184,371 and 3,261,894, of Alois Seidl, U.S. Pat. No. 3,331,694 of Heidrich et al, and Application Ser. No. 56,075.

According to U.S. Pat. Nos. 3,184,371 and 3,261,894, a preliminary product is produced by:

(a) forming a solution containing in parts by weight about 1 part alkali metal silicate, wherein the molar ratio of $Na_2O:SiO_2$ is 1:2.5 to 1:4.5, 0.02 to 0.8 parts of inorganic fibrous silicate or finely powdered silicate and 2-10 parts of water;

(b) adding means for producing foaming gas to the solution; and (c) heating the solution to about 140°-360° C to drive off any free water phase.

According to U.S. Pat. No. 3,331,694 a preliminary product is produced by ball milling a typical window glass composition to a degree of fineness that 80 percent passes a 50 $\mu$ sieve and then adding 0.3 to 1.5 percent of a car bonaceous foaming agent, such as carbon-black or lamp-black to the ball mill.

According to Application Ser. No. 56,075, a method of producing fillers for bricks, chamotte, tiles and the like structural materials is disclosed comprising the steps of:

(a) dissolving about 0.02 to 0.7 parts by weight of fibrous inorganic silicate in one part by weight of an aqueous alkali metal silicate solution;

(b) evaporating the mixture to a water content of about 5-20 percent by heating;

(c) granulating the dried material to a particle size between about 0.5-20 mm;

(d) coating the granulated material with a dispersion of a high melting inorganic compound having a melting point between about 1,200° to 2,500° C; and (e) heating the coated material between about 600° and 1000° C to produce foamed glass particles having a melting point between about 500° to 900° C.

In the purification of surface and ground water to obtain useful water, water for industrial use, and drinking water, the removal of mechanically suspended impurities by filtration is a conventional process stage in the purification, especially in the case where a flocculation with metallic salts takes place in the course of the water purification process.

Most simply, the filtration is conducted by means of sand and gravel layers, wherein large area filter tanks are provided with layers of coarse gravel, fine gravel, and sand so that the grains become finer from the bottom toward the top. Apart from the fact that the filter efficiency per square meter of filtering surface is low, due to the low filtration rate, the lifetime of the filters is short, because practically only the surface of the filter is effective, and a filtration in the lower strata does not occur. The filtration rate can be increased considerably by employing closed pressure filters in place of the simple gravity filters. Since also in this instance only the surface of the filter medium becomes effective, the filter service lifetime is likewise short. This lifetime can be considerably lengthened by directing filtration against the force of gravity, i.e., from the bottom toward the top, or from the coarse grains to the fine grains, because in this case the precipitate is retained in the deeper strata of the filter mass. However, in this mode of operation, the filtration rate must be lowered to a few meters per hour, in order to avoid turbulence in the layer of fine grains disposed on the pure water side — and thus to avoid secondary turbidity.

The state of the prior art methods for filtering against the force of gravity (from the coarse grains to the fine grains) may be ascertained by reference to U.S. Pat. Nos. 3,171,801 to Rice et al, which issued Mar. 2, 1965, and 3,202,286 of Smit, which issued Aug. 24, 1965. In the patent of Rice et al, as shown in the drawing, water to be purified is passed downward through a series of filters wherein the filters have coarse to fine particles. As shown in FIGS. 1 and 2 of Smith, the flow through the filter from the coarse to fine particles is accomplished against gravity by the use of a vacuum.

Optimum filtration conditions would prevail if the filter layer were constructed so that the bottom layer exhibited a granular size of about 0.2-1 mm, and thereabove the layers were of a grain size of 1-1.5 mm., then of 1.5-2 mm., and finally in the top layer of a grain size of about 2-4 mm. Such a filter would be operable at high filtration rates in the direction of gravity, would have a filter effect throughout the entire thickness of the filter bed, and thus would have a very long lifetime at a very low pressure loss. The breakthrough safety would be high, since the extremely fine-grained filter layer at the water exit has the effect of a safety zone at any load condition. A filter constructed in this way has not existed in practice heretofore, however, because it could not be regenerated by backwashing. For during the sedimentation after any washing, the coarse particles would be deposited first of all, and the fine particles last of all; consequently, the layering sequence would be reversed and all advantages initially obtained would again be eliminated.

Attempts to obtain the sedimentation sequence in the desired way by the selection and utilization of products, the granular density of which is lower at a larger diameter than in the case of smaller diameter only enjoyed partial success. The reason for this is that the grain density of the substances usable for the filtration could be varied maximally only between 1.8 and 2.5 kilograms/liter. Only the combination of hydroanthracite/quartz sand has found acceptance in practice, but the high price of hydroanthracite has prevented a wide use thereof.

SUMMARY OF THE INVENTION

Having in mind the limitations of the prior art, it is an object of the present invention to provide novel filter material which, with the same characteristics of the material, can be varied in density between 1.0 and 2.2 grams/cubic centimeter, is producible at any density in this range in a grain size of 0.3–10 mm., and wherein the grain surface can be fashioned within wide limits to be smooth or rough.

Accordingly, the filter sand of the present invention consists of amorphous and/or crystalline pulverized substances which are formed, with a binder and/or a preliminary product manufactured according to U.S. Pat. Nos. 3,184,371; 3,261,894; and/or 3,331,694; and/or German Published Application 1,671,266, into small spheres and are molten at temperatures of about 600°–1000° C, and preferably above 700° C. Furthermore, the filter sand exhibits differing grain densities of between about 1.0 and 2.2 g/cm$^3$, as well as varying grain diameters of between about 0.3 and 10 mm., with the provision that the grain density decreases with increasing grain diameter. Also, the filter sand is characterized by a grain having a smooth surface or by a grain having a rough surface.

DESCRIPTION OF THE PREFERRED EMBODIMENTS

In order to produce this filter material, the amorphous and/or crystalline pulverized substances are finely ground together with the preliminary product in a ratio of 2 to 6:1, granulated with the addition of water, dried, and melted, optionally with the use of separating agents for providing a rough surface. Thus, in one operating step, grain densities of between 1.0 and 2.2 g/cm$^3$ are formed. The finely ground product is, if necessary, ground together in a ball mill, tube mill, or similar operating plant. The mixture is granulated with the addition of water, wherein, according to another feature of this invention, inorganic binders can be dissolved, such as sodium silicate and/or organic binders, such as polyvinyl alcohol, gelatin, bone glue and carboxymethylcellulose in quantities of up to 5 percent by weight, preferably 0.1 to 2 percent. Then, the granulated product is dried and thereafter melted in a cylindrical rotary kiln, a fluidized bed furnace, or like devices, at above 700° C. The term "melted" is to mean, in this connection, also a superficial melting or sintering procedure.

By amorphous pulverized substances is meant ground slag from different sources, fly ash from different sources, ground pumice, ground basalt and crushed lava.

The crystalline pulverized substances of the present invention include ground quartz and crushed natural silicate.

In place of the above-disclosed preliminary product, it is also possible to mix a correspondingly fine glass powder of a sufficiently waterproof and physiologically acceptable composition with ground blast furnace slag and grind these materials, optionally, together and then granulate the same with a dilute sodium silicate solution or water, which can contain inorganic or organic binders. After drying, a melting step at temperatures of about 700° C must subsequently be conducted in this case.

The formation of the grain densities of between 1.0 and 2.2 g/cm$^3$ is effected by expanding at temperatures of between about 400° and about 700° C and a condensing melting procedure at temperatures of above about 700° C with partial loss of the porous structure.

The grain density can be determined by the mixing ratio of ground slag to the preliminary product and/or the glass powder. This weight ratio is, depending on the quality and properties of the ground slag and/or the glass powder, generally 4–40 : 1, preferably 4–20 : 1. The duration and/or the temperature of the melting step offer additional possibilities for varying the grain density.

During melting, especially in a cylindrical rotary kiln, it is advantageous to add a separating agent or powdering agent (ground limestone, chalk, dolomide meal, kieselguhr, slag powder, etc.), in order to avoid agglomeration, or sintering of the individual grains. Any excess of separating agents can readily be separated from the finished product by screening, pneumatic classification, washing, etc., and, if desired, reused for the powdering step.

The bulk density in the case of a loosely piled material or a material charged by vibration can be influenced, in addition to being affected by the grain spectrum, also by the grain configuration. For example, a grain of as spherical a shape as possible will in the case of a narrow grain fraction, fill 55–58 percent of a given volume, and in the case of a wider grain spectrum 60–65 percent. A more angularly-shaped grain, which is readily obtained by appropriate granulating conditions, especially by providing a shorter operating period for the rounding step, occupies a volume of merely 45–50 percent.

The surface roughness of the granules can be varied within wide limits by using conventional, physiologically acceptable separating agents. The surface becomes the smoother, the finer the separating agent and the smaller the quantity used. The lower the bulk density of the separating agent and the more bizarre its grain configuration is, the rougher becomes the granule surface. For example, the roughest structure is obtained with the use of kieselguhr.

It has furthermore been found that it is unnecessary to produce the filter materials for the various filter layers, which materials differ in grain size and grain density, separately. If a granulated material containing grains of different sizes but of the same composition is subjected to the heat treatment, the small particles are heated through more quickly and are molten with less pores than the large particles.

When the duration and the temperature are appropriately adjusted, it is possible, for example, on one operating step to obtain a mixture of granules wherein the fine components of 0.3 – 1 mm. exhibit a grain density which is higher by about 0.5 – 0.8 g/cm$^3$ than that of the particles having a diameter of 4–5 mm. If this grain mixture is whirled in water and allowed to settle, it is found that the fine grain preferably settles first, whereas to coarse grain preferably settles last.

The present invention includes the concept of using the inorganic filter sand in gravity and pressure filters.

The following embodiment serves to explain the invention.

EXAMPLE 100 kg. of a preliminary product according to U.S. Patent 3,184,371 is ground finely together with 300 kg. of fine blast furnace slag in a ball mill for 90 minutes. The resulting pulverized mixture is granulated in a conventional manner on a granulating disk with the addition of water to a grain size of 0.2 – 2 mm. and thereafter dried in a cylindrical rotary kiln at temperatures of up to 200° C. The preliminary granulated material obtained in this manner is mixed with about 10 kg. of chalk as a separating agent for the grains, and brought to temperatures of above 700° C (measured in the furnace outlet) in a cylindrical rotary kiln directly heated in a counterflow. In the inlet zone of the cylindrical rotary kiln, at a temperature of up to about 400° C, an expansion of the grain takes place and, toward the outlet of the tube in the higher temperatures, the grain is compressed by sintering and/or melting progressing from the outside toward the interior.

By the simultaneous melt treatment of the grains with varying diameters, a mixed granulated material of the varying grain density according to this invention is formed, wherein larger grains exhibit a smaller grain density than smaller grains, the porous structure of which has been lost to a great extent. This mixed granulated material is employed as filter sand.

Containers for the removal of suspended substances from water by means of filtration, have a water drain at the bottom, thereabove a coarse gravel filling, gravel diameter >10 mm., thereabove a screen plate with a fine perforation, thereabove the filter sand in grain sizes of 0.3 – 2 mm. Above the container is the water inlet in the case of gravity filters. Heretofore, washed river sand having a uniform grain size has been employed, which sand, after the backwashing and whirling of the soiled filter sand, was deposited so that the larger grains were at the bottom and the finer grains were on the top. The filter lifetime rapidly decreased due to contamination of the upper fine sand layer, whereas the lower coarse sand layer was used not at all or only to a small extent.

The filter sand of this invention is deposited in an entirely different way after the backwashing which takes place by whirling the filter sand. The reason for this is that it has a smaller grain density at a larger grain diameter. The heavier fine sand particles are deposited first of all, and the lighter, larger grains settle on top thereof. Thus, the filter lifetime is doubled and tripled, since almost the entire thickness of the filter can be used.

We claim:

1. In a process for removing solids from a liquid wherein said liquid is passed through a bed of filter media consisting of discrete, inorganic, artifically produced filter sand having the same chemical composition, the improvement comprising passing said liquid over artifically produced filter sand having grain densities of between about 1.0 and 2.2 grams per cubic centimeter, and grain diameters of between about 0.3 and 10 mm, wherein the grain density decreases with increasing grain diameter, backwashing said artifically produced filter sand and settling said artifically produced filter sand with sand grain diameters distributed from the largest to the smallest in the direction of liquid passage, said discrete, inorganic artifically produced filter sand consists essentially of a preliminary product mixed with a powder selected from the group consisting of amorphous particles, crystalline materials, and mixtures thereof, granulated with addition of water, dried, expanded at a temperature up to about 400° C, melting the outside at a temperature of about 700° C, and cooling to form spheres, said preliminary product produced by:
   (a) forming a solution containing in parts by weight about 1 part sodium silicate, having a molar ratio of $Na_2O:SiO_2$ of 1:2.5 to 1:4.5, 0.02 parts to 0.8 parts of inorganic fibrous silicate or finely powdered silicate and 2–10 parts of water;
   (b) adding means for producing foaming gas to the solution; and
   (c) heating the solution to about 140° – 360° C to drive off any free water phase.

2. The process of claim 1, wherein said powder is finely ground with said preliminary product in a ratio by weight of about 2 to 6:1; granulated with the addition of water, dried, expanded at a temperature of up to about 400° C and melted above 700° C to form spheres having a density of between about 1.0 and 2.2 g/cm$^3$ in one operating step.

3. The process of claim 2, further comprising the addition of a separating agent to said fine grinding step to produce spheres with a rough surface.

4. The process of claim 3, wherein said separating agent is selected from the group consisting of chalk, kieselguhr, ground slag, ground limestone and dolomite meal.

5. The process of claim 2, further comprising the addition of about 0.1 to 5 percent by weight of a binder selected from the group consisting of sodium silicate and polyvinyl alcohol to the water added before the granulation step.

6. The process of claim 2, wherein said granulated material is dried at temperatures between about 400° C and 700° C to expand the granulated material to spheres and melted above about 700° C to contract the spheres with partial loss of the porous structure.

7. The process of claim 1, wherein said crystalline materials are selected from the group consisting of ground quartz and crushed natural silicate.

8. The process of claim 1, wherein said amorphous materials are selected from the group consisting of ground slag, fly ash, ground pumice, ground basalt and crushed lava.

9. In a process for removing solids from a liquid wherein said liquid is passed through a bed of filter media consisting of discrete, inorganic, artificially produced filter sand having the same chemical composition, the improvement comprising passing said liquid over artifically produced filter sand having grain densities of between about 1.0 and 2.2 grams per cubic centimeter, and grain diameters of between about 0.3 and 10 mm, wherein the grain density decreases with increasing grain diameter, backwashing said artifically produced filter sand and settling said artifically produced filter sand with said grain diameters distributed from the largest to the smallest in the direction of liquid passage said discrete, inorganic, artifically produced filter sand consists essentially of a preliminary product mixed with a powder selected from the group consisting of amorphous particles, crystalline materials and mixtures thereof, granulated with addition of water, dried, expanded at a temperature up to about 400° C, melting the outisde at a temperature above 700° C, cooling to form spheres, said preliminary product produced by finely grinding a window glass composition and mixing therewith about 0.3 to 1.5 percent by weight of a carbonaceous foaming agent.

* * * * *